(12) United States Patent
Matsushita

(10) Patent No.: US 11,757,347 B2
(45) Date of Patent: Sep. 12, 2023

(54) HIGH-SIDE GATE DRIVE VOLTAGE GENERATION CIRCUIT AND SEMICONDUCTOR MODULE

(71) Applicant: Mitsubishi Electric Corporation, Tokyo (JP)

(72) Inventor: Narumi Matsushita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 113 days.

(21) Appl. No.: 17/488,114

(22) Filed: Sep. 28, 2021

(65) Prior Publication Data

US 2022/0190717 A1 Jun. 16, 2022

(30) Foreign Application Priority Data

Dec. 15, 2020 (JP) .................................. 2020-207681

(51) Int. Cl.
*H02M 1/08* (2006.01)
*H02M 1/00* (2006.01)
*H02M 1/32* (2007.01)

(52) U.S. Cl.
CPC ............ *H02M 1/08* (2013.01); *H02M 1/0006* (2021.05); *H02M 1/32* (2013.01)

(58) Field of Classification Search
CPC ......... H02M 1/0006; H02M 1/08; H02M 1/32
See application file for complete search history.

(56) References Cited

U.S. PATENT DOCUMENTS

| | | | | |
|---|---|---|---|---|
| 8,970,185 B1* | 3/2015 | Sutardja | .................. | H02M 1/08 323/266 |
| 2010/0289560 A1* | 11/2010 | Mavencamp | ........... | H02M 1/08 327/538 |
| 2011/0260707 A1* | 10/2011 | Imanishi | ................. | H02M 1/08 323/311 |
| 2018/0034384 A1 | 2/2018 | Imura | | |

FOREIGN PATENT DOCUMENTS

| | | | | |
|---|---|---|---|---|
| JP | 2016-136805 A | 7/2016 | | |
| JP | 2016-201661 A | 12/2016 | | |
| JP | 2018-019520 A | 2/2018 | | |
| KR | 10-2230129 B1 * | 1/2020 | .............. | H02M 1/08 |

* cited by examiner

*Primary Examiner* — Kyle J Moody
*Assistant Examiner* — Jye-June Lee
(74) *Attorney, Agent, or Firm* — Studebaker & Brackett PC

(57) ABSTRACT

Provided is a voltage generation circuit for improving the characteristics of a high-side switching element by applying an appropriate control power supply voltage to the high-side drive circuit. The voltage generation circuit includes a bootstrap circuit and a step-down circuit. The bootstrap circuit includes a diode and a current limiting resistor. The step-down circuit is connected to a high potential side of the high-side switching element and an input side of the bootstrap circuit. The step-down circuit outputs a compensated power supply voltage generated by stepping down a power supply voltage applied to the high potential side of the high-side switching element to the bootstrap circuit. The step-down circuit generates the compensated power supply voltage obtained by adding a compensation voltage corresponding to a voltage drop due to the diode and the current limiting resistor to a control power supply voltage for a low-side drive circuit.

11 Claims, 5 Drawing Sheets

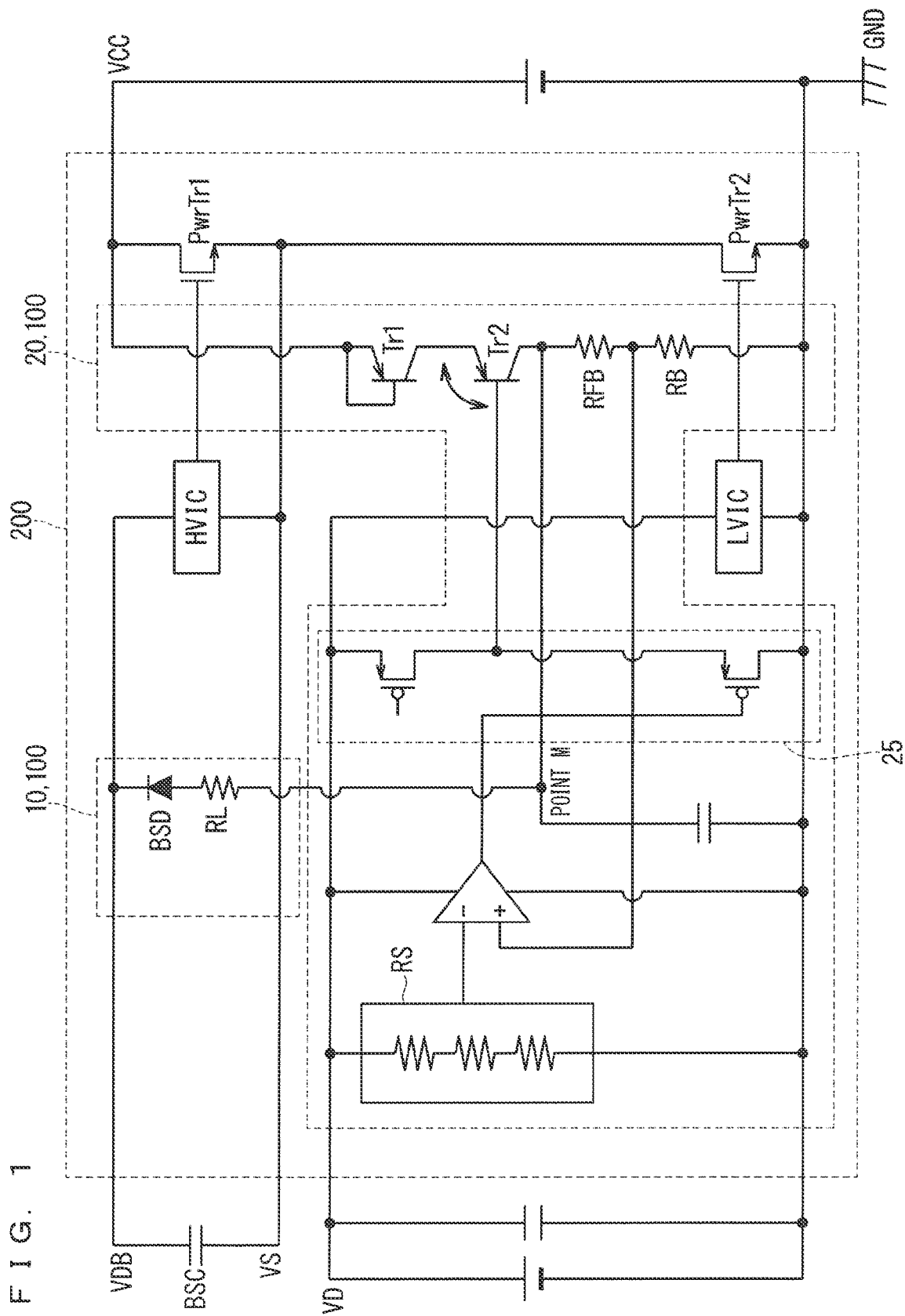
F I G. 1

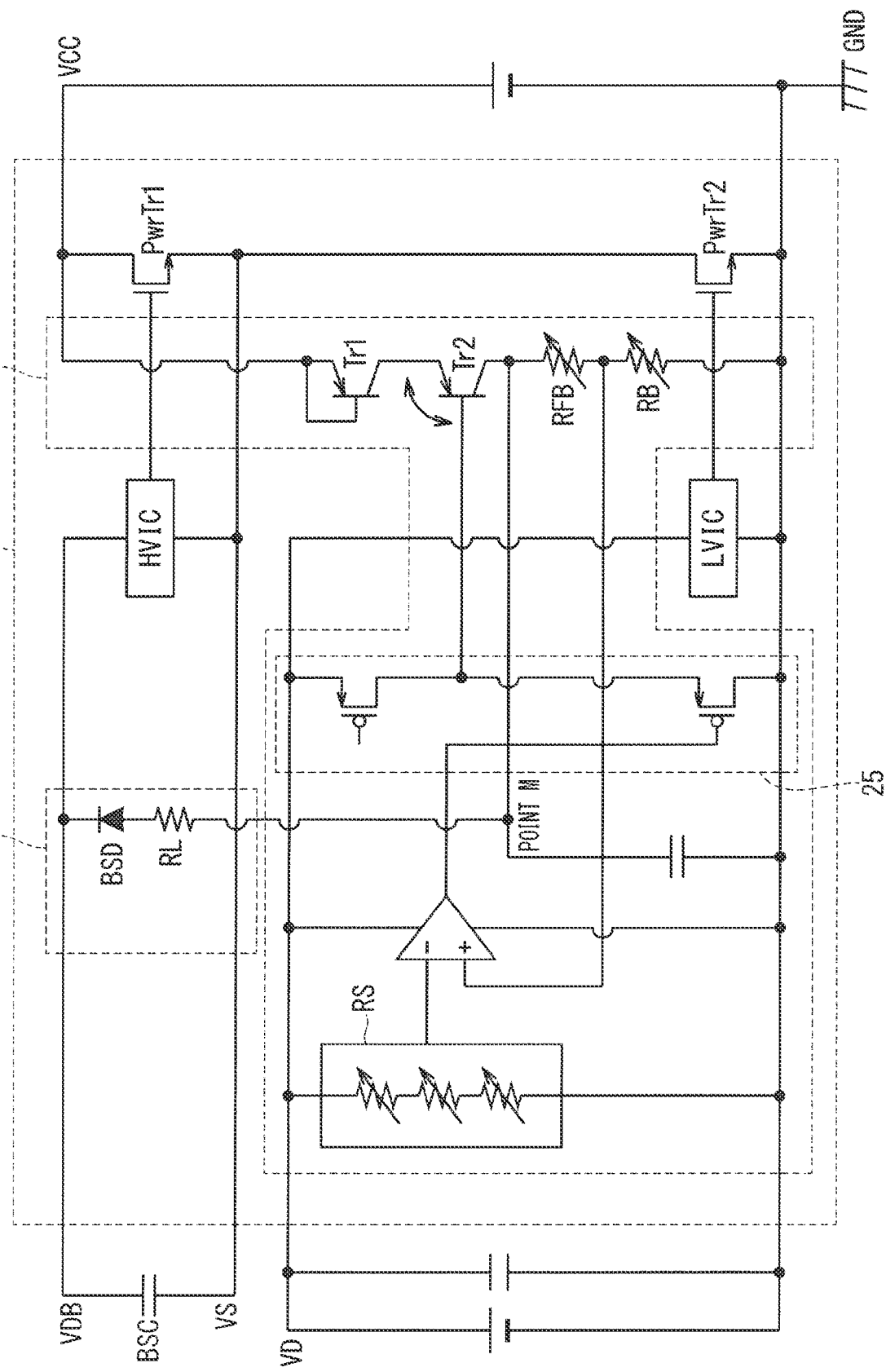
F I G. 2

F I G. 4
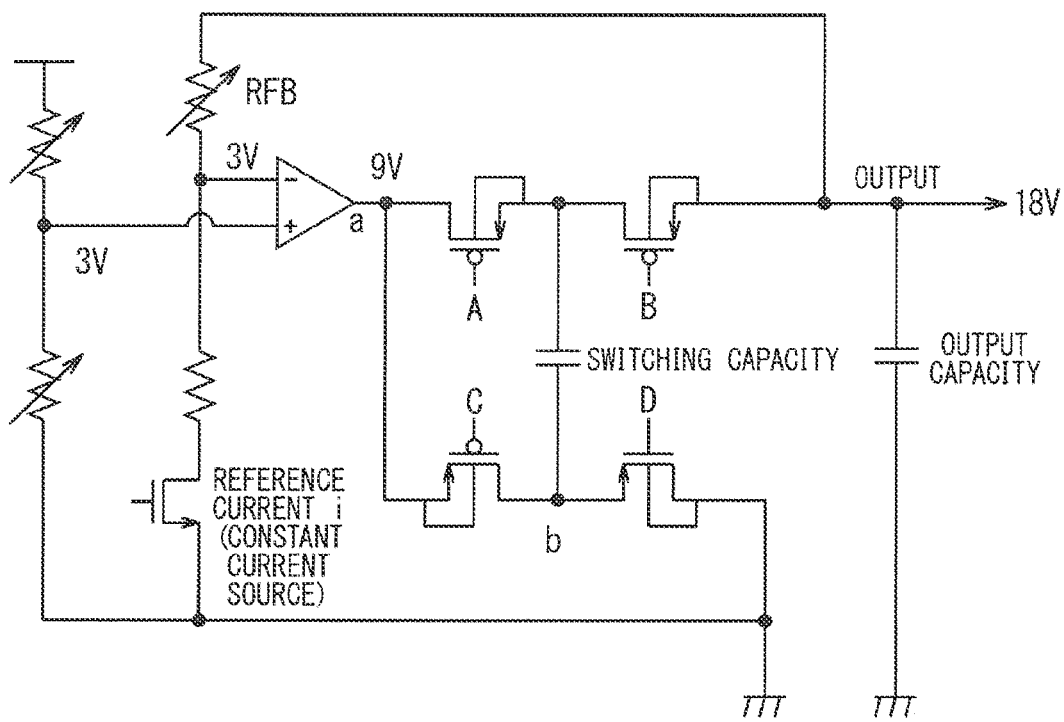
F I G. 5
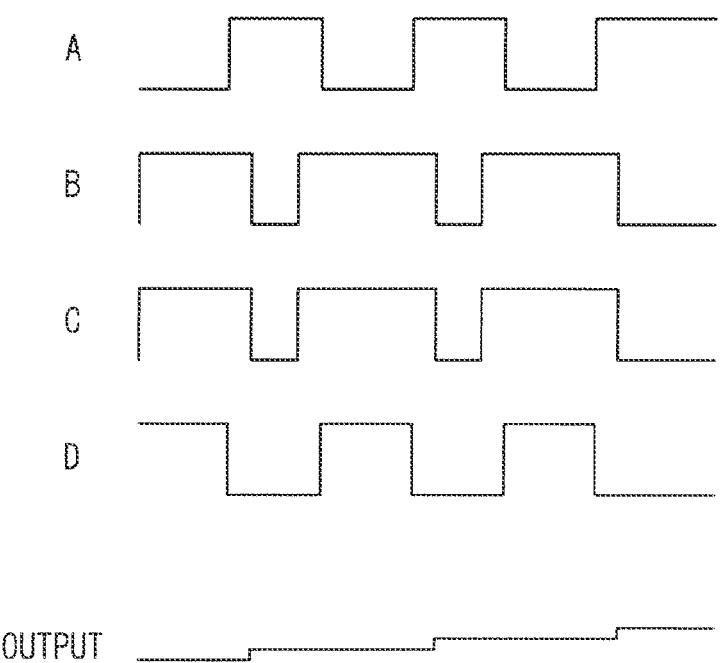

HIGH-SIDE GATE DRIVE VOLTAGE GENERATION CIRCUIT AND SEMICONDUCTOR MODULE

BACKGROUND OF THE INVENTION

Field of the Invention

The present disclosure relates to a voltage generation circuit and a semiconductor module.

Description of the Background Art

A power semiconductor module that controls an inductor load such as a motor with a three-phase inverter has a circuit configuration in which an upper switching element (high-side switching element) and a lower switching element (low-side switching element) are connected in series with each other. The high-side switching element is controlled by a high-side drive circuit, and the low-side switching element is controlled by a low-side drive circuit.

Typically, the control power supply voltage for operating the low-side drive circuit is based on the GND potential of the switching element and is applied from the outside. The control power supply voltage for operating the high-side drive circuit is generated from the control power supply voltage for the low-side drive circuit in some cases. The control power supply voltage for the high-side drive circuit is a potential based on the potential between the high-side switching element and the low-side switching element, and requires a potential higher than the control power supply voltage for the low-side drive circuit. A bootstrap circuit is used to generate a control power supply voltage for the high-side drive circuit (see, for example, Japanese Patent Application Laid-Open No. 2016-201661).

The bootstrap circuit is provided with a bootstrap diode and a limiting resistor to protect the circuit from overcurrent. When the control power supply voltage for the high-side drive circuit is generated, a voltage drop corresponding to the forward voltage of the bootstrap diode and a voltage drop due to the limiting resistor occur. As a result, the control power supply voltage for the high-side drive circuit deviates from the appropriate voltage range, and the characteristics of the high-side switching element become worse than the characteristics of the low-side switching element in some cases.

SUMMARY

The present disclosure provides a voltage generation circuit for improving the characteristics of the high-side switching element by applying an appropriate control power supply voltage to the high-side drive circuit in order to solve the above problems.

The voltage generation circuit according to the present disclosure generates a control power supply voltage for the high-side drive circuit for operating the high-side drive circuit that controls the state of a high-side switching element of the high-side switching element and the low-side switching element connected in series with each other. The voltage generation circuit includes a bootstrap circuit and a step-down circuit. The bootstrap circuit includes a diode having a cathode connected to a high potential side of the high-side drive circuit to which the control power supply voltage for the high-side drive circuit is applied, and a current limiting resistor connected in series to the diode. The step-down circuit is connected to a high potential side of the high-side switching element and an input side of the bootstrap circuit. The step-down circuit outputs a compensated power supply voltage to the bootstrap circuit. The compensated power supply voltage is generated by stepping down a power supply voltage which is applied to the high potential side of the high-side switching element. The compensated power supply voltage is a voltage for generating the control power supply voltage for the high-side drive circuit via the bootstrap circuit. The step-down circuit generates the compensated power supply voltage obtained by adding a compensation voltage corresponding to a voltage drop due to the diode and the current limiting resistor to a control power supply voltage for a low-side drive circuit for operating the low-side drive circuit that controls a state of the low-side switching element.

According to the present disclosure, the voltage generation circuit for improving the characteristics of a high-side switching element by applying an appropriate control power supply voltage to the high-side drive circuit is provided.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram illustrating a circuit configuration of a voltage generation circuit and a semiconductor module including the same according to Embodiment 1;

FIG. 2 is a diagram illustrating a circuit configuration of a voltage generation circuit and a semiconductor module including the same according to Embodiment 2;

FIG. 4 is a circuit diagram illustrating an example of a booster circuit according to Embodiment 3;

FIG. 5 is a circuit diagram illustrating an operation example of the booster circuit according to Embodiment 3.

DESCRIPTION OF THE PREFERRED EMBODIMENTS

Embodiment 1

Figure 3:
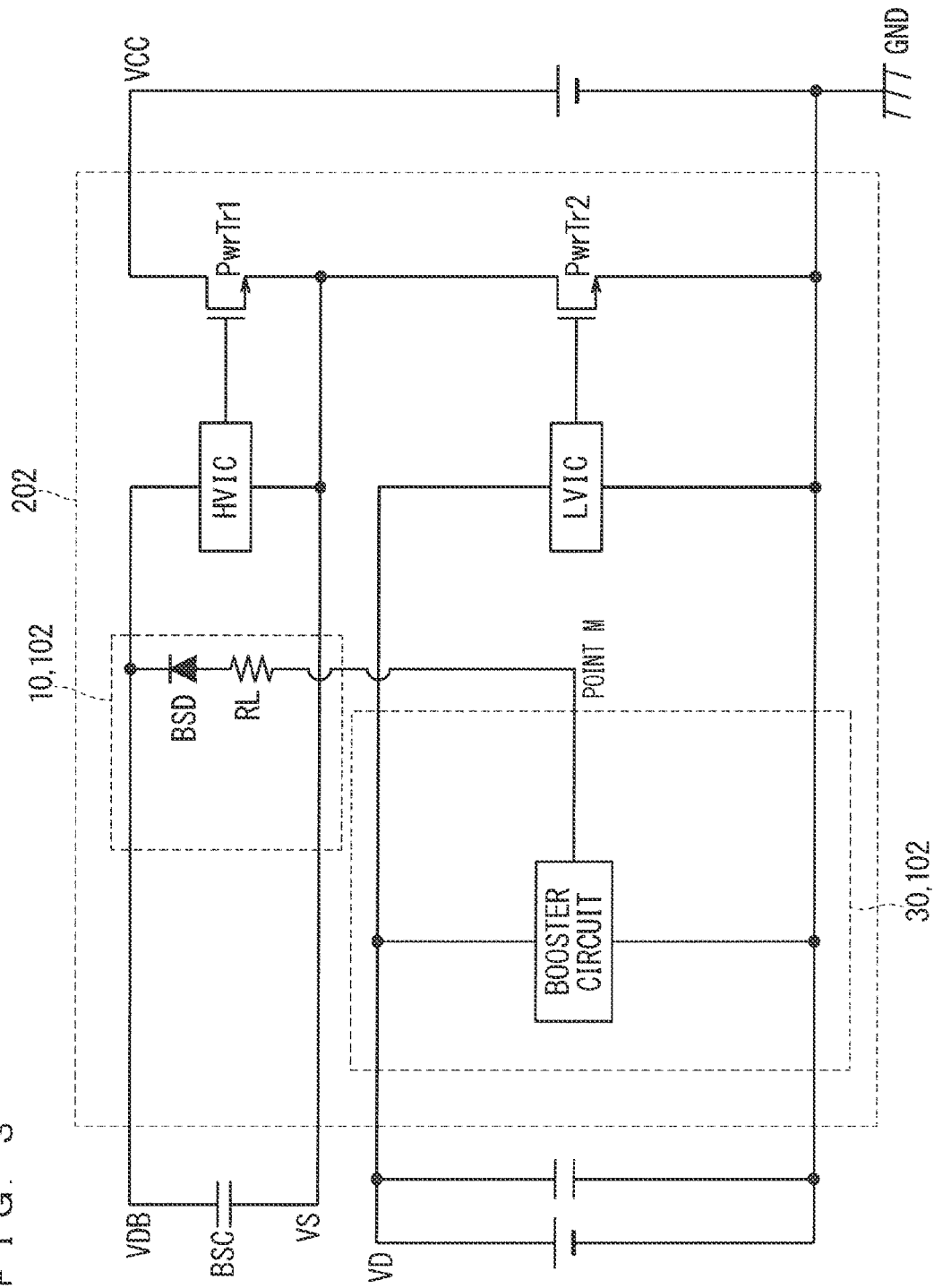
FIG. 3 is a diagram illustrating a circuit configuration of a voltage generation circuit and a semiconductor module including the same according to Embodiment 3.

FIG. 1 is a diagram illustrating a circuit configuration of a voltage generation circuit 100 and a semiconductor module 200 including the same according to Embodiment 1.

The semiconductor module 200 includes a high-side switching element PwrTr1, a low-side switching element PwrTr2, a high-side drive circuit (High Voltage Integrated Circuit, HVIC), a low-side drive circuit (Low Voltage Integrated Circuit, LVIC), and a voltage generation circuit 100.

The high-side switching element PwrTr1 and the low-side switching element PwrTr2 are connected in series with each other. The high-side switching element PwrTr1 and the low-side switching element PwrTr2 are formed of, for example, a semiconductor such as Si or a so-called wide band-gap semiconductor such as SiC or GaN. The high-side switching element PwrTr1 and the low-side switching element PwrTr2 in Embodiment 1 are n-channel Metal-Oxide-Semiconductor Field-Effect Transistors (MOSFETs). The source of the high-side n-channel MOSFET is connected to the drain of the low-side n-channel MOSFET. When the semiconductor module 200 controls the inductor load, the inductor load is connected to an output terminal between the high-side n-channel MOSFET and the low-side n-channel MOSFET. Then, the drain of the high-side n-channel MOSFET is connected to a main power supply voltage VCC, and the source of the low-side n-channel MOSFET is connected to a GND potential.

The inductor load is, for example, a motor.

The LVIC controls the state (ON state/OFF state) of the low-side switching element PwrTr2. The output terminal of the LVIC is connected to the gate of the low-side switching element PwrTr2. The control power supply voltage VD for the low-side drive circuit for operating the LVIC is applied from the outside. The control power supply voltage VD for the low-side drive circuit is determined based on the GND potential on the low potential side of the low-side switching element PwrTr2. The control power supply voltage VD for the low-side drive circuit corresponds to the potential required to switch the state of the low-side switching element PwrTr2. The LVIC applies the control power supply voltage VD for the low-side drive circuit to the gate of the low-side switching element PwrTr2 on the basis of a low-side control signal output from a processor or the like.

The HVIC controls the state (ON state/OFF state) of the high-side switching element PwrTr1. The output terminal of the HVIC is connected to the gate of the high-side switching element PwrTr1. The control power supply voltage VDB for the high-side drive circuit for operating the HVIC is generated from the control power supply voltage VD for the low-side drive circuit for operating the LVIC and the main power supply voltage VCC. The control power supply voltage VDB for the high-side drive circuit is determined based on the potential between the high-side switching element PwrTr1 and the low-side switching element PwrTr2. That potential is referred to as the reference potential VS. The control power supply voltage VDB for the high-side drive circuit corresponds to the potential required to switch the state of the high-side switching element PwrTr1. The HVIC applies the control power supply voltage VDB for the high-side drive circuit to the gate of the high-side switching element PwrTr on the basis of a high-side control signal output from a processor or the like.

The voltage generation circuit 100 generates the control power supply voltage VDB for the high-side drive circuit from the control power supply voltage VD for the low-side drive circuit and the main power supply voltage VCC. The voltage generation circuit 100 includes a bootstrap circuit 10 and a step-down circuit 20.

The bootstrap circuit 10 includes a bootstrap diode BSD and a current limiting resistor RL. A bootstrap capacitor BSC is provided outside the semiconductor module 200. The high potential side of the bootstrap capacitor BSC and the cathode of the bootstrap diode BSD are connected to the high potential side of the HVIC. The low potential side of the bootstrap capacitor BSC is connected to the low potential side of the HVIC. That is, the low potential side of the bootstrap capacitor BSC is equal to the reference potential VS. The current limiting resistor RL is connected in series to the anode of the bootstrap diode BSD. The current limiting resistor RL is provided to prevent the overcurrent generated at the initial stage of charging the bootstrap capacitor BSC from entering the power supply that applies the control power supply voltage VD for the low-side drive circuit.

The step-down circuit 20 is connected to the drain on the high potential side of the high-side switching element PwrTr1 and the current limiting resistor RL provided on the input side of the bootstrap circuit 10. The step-down circuit 20 steps down the main power supply voltage VCC applied to the drain of the high-side switching element PwrTr1 and thereby generates a compensated power supply voltage VM. In FIG. 1, the voltage at the point M corresponds to the compensated power supply voltage VM. The compensated power supply voltage VM is a voltage obtained by adding the compensation voltage corresponding to the voltage drop due to the bootstrap diode BSD and the current limiting resistor RL to the control power supply voltage VD for the low-side drive circuit. The voltage drop due to the bootstrap diode BSD corresponds to the forward voltage drop VF. The value of "compensation voltage corresponding to voltage drop" does not have to match the value of voltage drop due to the bootstrap diode BSD and the current limiting resistor RL. The "compensation voltage corresponding to voltage drop" means that the value is equal to or higher than a predetermined lower limit value to the voltage drop. For example, when the predetermined lower limit value is set to −10% and the voltage drop is 1.0 V, the compensation voltage is preferably 0.9 V or higher. The predetermined lower limit is, for example, defined by the lower limit of the control power supply voltage VDB for the high-side drive circuit generated from the compensated power supply voltage VM, that is, the range of the gate voltage for appropriately driving the high-side switching element PwrTr1. The step-down circuit 20 outputs the compensated power supply voltage VM to the input side of the bootstrap circuit 10.

The step-down circuit 20 in Embodiment 1 includes a bipolar transistor Tr1, a bipolar transistor Tr2, at least one voltage dividing circuit, and a comparator (or operational amplifier). The voltage dividing circuit has a plurality of resistors connected in series with each other. Here, one voltage dividing circuit includes a plurality of reference voltage generating resistors RS, and another voltage dividing circuit includes a feedback resistor RFB and a resistor RB as a plurality of resistors. The voltage dividing circuit controls the step-down level of the main power supply voltage VCC. The main power supply voltage VCC is stepped down by the bipolar transistor Tr1 and current-voltage converted by the feedback resistor RFB and resistor RB. At this point, the step-down circuit 20 compares the two input voltages generated by the resistor RB and the reference voltage generating resistor RS with a comparator. The resistance value of any of the reference voltage generating resistor RS, the feedback resistor RFB, and the resistor RB is determined based on the comparison result. The compensated power supply voltage VM is greater than the control power supply voltage VD for the low-side drive circuit. Preferably, the compensated power supply voltage VM is set to equal to or greater than the sum of the control power supply voltage VD for the low-side drive circuit and the voltage value corresponding to the voltage drop due to the bootstrap diode BSD and the current limiting resistor RL by the voltage dividing circuit (VM≥VD+VF+I×RL).

When the low-side switching element PwrTr2 is in the ON state, the low potential side of the bootstrap capacitor BSC is equivalent to the GND potential. A voltage is applied to the high potential side of the bootstrap capacitor BSC via the bootstrap circuit 10. In other words, the bootstrap capacitor BSC is charged. The voltage corresponds to the control power supply voltage VDB for the high-side drive circuit. The control power supply voltage VDB for the high-side drive circuit (e.g. 15V) is lower than the compensated power supply voltage VM (e.g. 16V) at point M by the voltage drop due to the bootstrap diode BSD and the current limiting resistor RL (e.g. 1V). When the low-side switching element PwrTr2 is in the OFF state, the low potential side of the bootstrap capacitor BSC is equivalent to the reference potential VS (e.g. 600V) between the high-side switching element PwrTr1 and the low-side switching element PwrTr2. Further, in the bootstrap diode BSD, a reverse bias is applied. Therefore, the control power supply voltage VDB for the high-side drive circuit (615 V with respect to the GND potential and 15 V with respect to the reference potential VS) is applied from the bootstrap capacitor BSC to the HVIC.

Summarizing the above, the voltage generation circuit 100 in Embodiment 1 generates the control power supply voltage VDB for the high-side drive circuit for operating the HVIC that controls the state of the high-side switching element PwrTr1 of the high-side switching element PwrTr1 and the low-side switching element PwrTr2 connected in series with each other. The voltage generation circuit 100 includes the bootstrap circuit 10 and the step-down circuit 20. The bootstrap circuit 10 includes the bootstrap diode BSD and the current limiting resistor RL. The bootstrap diode BSD has the cathode connected to the high potential side of the HVIC to which the control power supply voltage VDB for the high side drive circuit is applied. The current limiting resistor RL is connected in series to the bootstrap diode BSD. The step-down circuit 20 is connected to the high potential side of the high-side switching element PwrTr1 and the input side of the bootstrap circuit 10. The step-down circuit 20 outputs the compensated power supply voltage VM to the bootstrap circuit 10. The compensated power supply voltage VM is generated by stepping down the main power supply voltage VCC which is applied to the high potential side of the high-side switching element PwrTr1. The compensated power supply voltage VM is a voltage for generating the control power supply voltage VDB for the high-side drive circuit via the bootstrap circuit 10. The step-down circuit 20 generates the compensated power supply voltage VM obtained by adding the compensation voltage corresponding to the voltage drop due to the bootstrap diode BSD and the current limiting resistor RL to the control power supply voltage VD for the low-side drive circuit for operating the LVIC that controls the state of the low-side switching element PwrTr2.

Such a voltage generation circuit 100 generates the compensated power supply voltage VM greater than the control power supply voltage VD for the low-side drive circuit. The compensated power supply voltage VM is maintained at equal to or greater than the sum of the control power supply voltage VD for the low-side drive circuit and the voltage value corresponding to the voltage drop due to the bootstrap diode BSD and the current limiting resistor RL. The voltage generation circuit 100 prevents the generation of a control power supply voltage VDB voltage for the high-side drive circuit that is lower than a predetermined appropriate voltage range. Therefore, the drive characteristics of the high-side switching element PwrTr1 are improved. Further, the generation of the control power supply voltage VDB for the high-side drive circuit by the step-down circuit 20 is immune to the effect of the potential change due to the transient response that may occur in a booster circuit such as a charge pump circuit. Therefore, the drive characteristics of the high-side switching element PwrTr1 are stabilized.

In Embodiment 1, although an example is illustrated in which the high-side switching element PwrTr1 and the low-side switching element PwrTr2 are n-channel MOSFETs, the high-side switching element PwrTr1 and the low-side switching element PwrTr2 may be n-channel Insulated Gate Bipolar Transistors (IGBTs). When the semiconductor module 200 is connected to an inductor load, the emitter of the low-side n-channel IGBT is connected to the GND potential and the collector of the high-side n-channel IGBT is connected to the main power supply voltage VCC. Further, in this case, a freewheeling diode is connected to each of the low-side n-channel IGBT and the high-side n-channel IGBT.

Further, as illustrated in FIG. 1, the step-down circuit 20 in Embodiment 1 is provided with a switching circuit 25. The switching circuit 25 has a function of reducing the current. However, when the bipolar transistor Tr2 adopts an IGBT or MOSFET, the switching circuit 25 is unnecessary.

A MOSFET is adopted for the high-side switching element PwrTr1 in Embodiment 1.

The downsizing of the semiconductor chip on which the MOSFET is formed depends on the saturation current characteristics (also referred to as current-voltage characteristics or Id-Vds characteristics). The voltage generation circuit 100 raises the potential of the control power supply voltage VDB for the high-side drive circuit, that is, the voltage to be applied to the gate of the high-side MOSFET, increasing the saturation current value. As a result, the reduction in size and cost of the semiconductor chip is ensured.

Embodiment 2

A voltage generation circuit and a semiconductor module according to Embodiment 2 will be described. Embodiment 2 is a subordinate concept of Embodiment 1. In Embodiment 2, the same components as those in Embodiment 1 are designated by the same reference numerals, and detailed description thereof will be omitted.

FIG. 2 is a diagram illustrating a circuit configuration of a voltage generation circuit 101 and a semiconductor module 201 including the same according to Embodiment 2.

The resistance value of a voltage dividing circuit in a step-down circuit 21 in Embodiment 2 is variable. For example, a feedback resistor RFB, a resistor RB and a reference voltage generating resistor RS are variable resistors. Alternatively, the voltage dividing circuit may be a voltage ladder. The voltage ladder has at least one terminal that is led out from between a plurality of resistors. The step-down level when the compensation voltage is generated from the main power supply voltage VCC is controlled by the resistance value of any one of the reference voltage generating resistor RS, the feedback resistor RFB, and the resistor RB. The step-down level corresponds to a potential difference between the main power supply voltage VCC and the compensation voltage.

Such a voltage generation circuit 101 ensures that the control power supply voltage VDB for the high-side drive circuit is set to an arbitrary potential in accordance with the characteristics of the high-side switching element PwrTr1. For example, when the high-side switching element PwrTr1 adopts an IGBT, the control power supply voltage VDB for the high-side drive circuit is set so that the high-side switching element PwrTr1 is driven in the linear region. When the high-side switching element PwrTr1 adopts a MOSFET, the control power supply voltage VDB for the high-side drive circuit is set to be driven with an arbitrary saturation current characteristic.

Further, the voltage generation circuit 101 ensures that the control power supply voltage VDB for the high-side drive circuit is set to an arbitrary value from the outside of the semiconductor module 201 in accordance with the intended use of the semiconductor module 201, that is, the drive conditions. This facilitates to change the step-down level.

Embodiment 3

A voltage generation circuit and a semiconductor module according to Embodiment 3 will be described. In Embodiment 3, the same components as those in Embodiment 1 or 2 are designated by the same reference numerals, and detailed description thereof will be omitted.

FIG. 3 is a diagram illustrating a circuit configuration of a voltage generation circuit 102 and a semiconductor module 202 including the same according to Embodiment 3.

The semiconductor module 202 includes a high-side switching element PwrTr1, a low-side switching element PwrTr2, a high-side drive circuit (HVIC), a low-side drive circuit (LVIC), and a voltage generation circuit 102.

The high-side switching element PwrTr1 and the low-side switching element PwrTr2 in Embodiment 3 are n-channel MOSFETs.

The voltage generation circuit 102 generates the control power supply voltage VDB for the high-side drive circuit from the control power supply voltage VD for the low-side drive circuit. The voltage generation circuit 102 includes a bootstrap circuit 10 and a booster circuit 30.

The booster circuit 30 is connected to the input side of the bootstrap circuit 10. The booster circuit 30 boosts the control power supply voltage VD for the low-side drive circuit for operating the LVIC to generate a compensated power supply voltage VM. As in Embodiment 1, the compensated power supply voltage VM is a voltage obtained by adding the compensation voltage corresponding to the voltage drop due to the bootstrap diode BSD and the current limiting resistor RL. The booster circuit 30 outputs the compensated power supply voltage VM to the bootstrap circuit 10.

FIG. 4 is a circuit diagram illustrating an example of the booster circuit 30. FIG. 5 is a diagram illustrating an operation example of the booster circuit 30. Here, the booster circuit 30 is a pumping circuit. The booster circuit 30 causes charge sharing between the switching capacity and the output capacity, and boosts the control power supply voltage VD for the low-side drive circuit. The booster circuit 30 also includes a voltage dividing circuit having a plurality of resistors connected in series with each other. The voltage dividing circuit boosts the divided voltage of the control power supply voltage VD for the low-side drive circuit. In other words, the potential difference before and after boosting by the booster circuit 30 is controlled by the voltage dividing circuit. The potential difference is referred to as a boosting level. Preferably, the boosting level is set so that the compensated power supply voltage VM is equal to or greater than the sum of the control power supply voltage VD for the low-side drive circuit and the voltage value corresponding to the voltage drop due to the bootstrap diode BSD and the current limiting resistor RL (VM≥VD+VF+I×RL).

The plurality of resistors in the voltage dividing circuit may be variable resistors. The voltage dividing circuit may be a voltage ladder having at least one terminal led out from between the plurality of resistors.

When the low-side switching element PwrTr2 is in the ON state, the bootstrap capacitor BSC is charged. The control power supply voltage VDB (e.g. 17V) for the high-side drive circuit in the bootstrap capacitor BSC corresponds to the voltage lower than the compensated power supply voltage VM (e.g. 18V) by the voltage drop (e.g. 1V) due to the bootstrap diode BSD and the current limiting resistor RL. When the low-side switching element PwrTr2 is in the OFF state, the control power supply voltage VDB for the high-side drive circuit (617V with respect to the GND potential and 17V with respect to the reference potential VS) is applied from the bootstrap capacitor BSC to the HVIC.

Summarizing the above, the voltage generation circuit 102 in Embodiment 3 includes the bootstrap circuit 10 and the booster circuit 30. The bootstrap circuit 10 includes the bootstrap diode BSD and the current limiting resistor RL. The bootstrap diode BSD has the cathode connected to the high potential side of the HVIC to which the control power supply voltage VDB for the high side drive circuit is applied. The current limiting resistor RL is connected in series to the bootstrap diode BSD. The booster circuit 30 is connected to the input side of the bootstrap circuit 10. The booster circuit 30 boosts the control power supply voltage VD for the low-side drive circuit to generate a compensated power supply voltage VM. The booster circuit 30 outputs the compensated power supply voltage VM to the bootstrap circuit 10. The booster circuit 30 generates the compensated power supply voltage VM obtained by adding the compensation voltage corresponding to the voltage drop due to the bootstrap diode BSD and the current limiting resistor RL to the control power supply voltage VD for the low-side drive circuit. The booster circuit 30 includes a voltage dividing circuit. The voltage dividing circuit has a plurality of resistors connected in series with each other and controls the boosting level of the control power supply voltage VD for the low-side drive circuit.

Such a voltage generation circuit 102 has a simple circuit configuration.

Therefore, the number of parts (for example, the number of IC chips) mounted on the semiconductor module 202 is small, and the power consumption is also small. In Embodiment 3, although the pumping circuit is illustrated as an example of the booster circuit 30, the booster circuit 30 is not limited thereto, and a source follower circuit may also be adopted.

Embodiment 4

A voltage generation circuit and a semiconductor module according to Embodiment 4 will be described. Embodiment 4 is a subordinate concept of Embodiment 1. In Embodiment 4, the same components as those in Embodiment 1 or 2 are designated by the same reference numerals, and detailed description thereof will be omitted.

Figure 6:
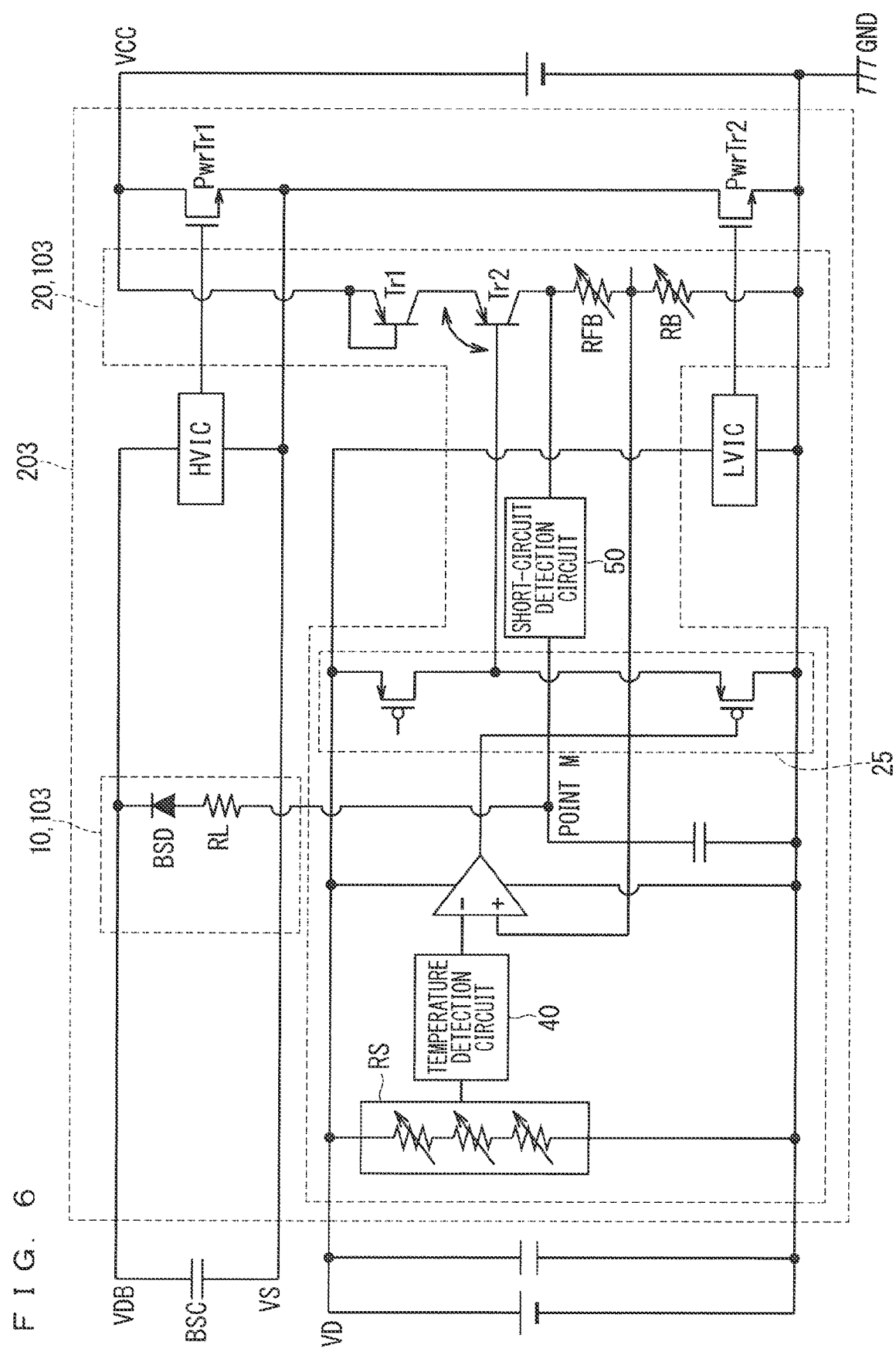
FIG. 6 is a diagram illustrating a circuit configuration of a voltage generation circuit and a semiconductor module including the same according to Embodiment 4.

FIG. 6 is a diagram illustrating a circuit configuration of a voltage generation circuit 103 and a semiconductor module 203 including the same according to Embodiment 4.

The voltage generation circuit 103 further includes a temperature detection circuit 40 that detects the temperature of the step-down circuit 20, and a short-circuit detection circuit 50 that detects a short circuit of the step-down circuit 20. The semiconductor module 203 including the voltage generation circuit 103 according to Embodiment 4 is referred to as an intelligent power module or an intelligent power device.

The temperature detection circuit 40 corrects the reference voltage when the reference voltage changes and falls outside the predetermined voltage range due to the temperature change of the step-down circuit 20.

The short-circuit detection circuit 50 corrects the voltage on the input side of the bootstrap circuit 10 when a short-circuit current flows through the high-side switching element PwrTr1 and the low-side switching element PwrTr2.

Such a voltage generation circuit 103 realizes stable driving of the semiconductor module 203. The voltage generation circuit 103 does not need to include both the temperature detection circuit 40 and the short-circuit detection circuit 50, and the effect corresponding to each configuration is obtained with either one circuit provided therein, When the voltage generation circuit 103 includes the booster circuit 30 illustrated in Embodiment 3 instead of the step-down circuit 20, the voltage generation circuit 103 may include the temperature detection circuit 40 that detects the temperature of the booster circuit 30 and the short-circuit detection circuit 50 that detects a short circuit of the booster circuit 30. Even in that case, the same effect as described above is obtained.

(Modification of Embodiment 4)

When the voltage generation circuit 103 includes the temperature detection circuit 40, the voltage generation circuit 103 further includes a terminal (not illustrated) from which a signal related to the detected temperature detected by the temperature detection circuit 40 is output to the outside. A control device (not illustrated) connected to the terminal controls a power supply that outputs a control power supply voltage VD for the low-side drive circuit on the basis of the signal related to the detected temperature. As a result, the control power supply voltage VD for the low-side drive circuit and the control power supply voltage VDB for the high-side drive circuit are appropriately controlled. That is, the control power supply voltage VD for the low-side drive circuit and the control power supply voltage VDB for the high-side drive circuit are feedback-controlled by the temperature of the step-down circuit 20. For example, the temperature of the semiconductor module 203 changes due to variations in the characteristics of the low-side switching element PwrTr2, the high-side switching element PwrTr1, the LVIC, and the HVIC. In Modification of Embodiment 4, the control power supply voltage VD for the low-side drive circuit controlled in accordance with the temperature change is applied to the LVIC. Similarly, the control power supply voltage VDB for the high-side drive circuit controlled in accordance with the temperature change is applied to the HVIC.

When the voltage generation circuit 103 includes the short-circuit detection circuit 50, the voltage generation circuit 103 further includes a terminal (not illustrated) from which a signal related to the short-circuit detection is output to the outside. A control device (not illustrated) connected to the terminal controls a power supply that outputs a control power supply voltage VD for the low-side drive circuit on the basis of the signal related to the short-circuit detection.

Embodiment 5

A voltage generation circuit and a semiconductor module according to Embodiment 5 will be described. Embodiment 5 is a subordinate concept of Embodiment 1. In Embodiment 5, the same components as those in Embodiments 1 to 3 are designated by the same reference numerals, and detailed description thereof will be omitted.

The semiconductor module according to Embodiment 5 incorporates a three-phase inverter circuit. The circuits in each phase correspond to any one of the circuits illustrated in FIGS. 1, 2, 3 and 6. That is, the semiconductor module includes three low-side switching elements PwrTr2, three high-side switching elements PwrTr1, three LVICs, three HVICs, and a voltage generation circuit. The voltage generation circuit according to Embodiment 5 includes any one of the step-down circuits 20 and 21 and the booster circuit 30. The three high-side switching elements PwrTr1 are connected in series to the three low-side switching elements PwrTr2, respectively. The semiconductor module is so-called a 6 in 1 type intelligent power module.

The control power supply voltage VD for the low-side drive circuit is applied to each of the three LVICs. The three low-side switching elements PwrTr2 are controlled by three LVICs, respectively. A control power supply voltage VDB for the high-side drive circuit generated by the voltage generation circuit is applied to each of the three HVICs. The three high-side switching elements PwrTr1 are controlled by three HVICs, respectively. An output terminal is provided between one high-side switching element PwrTr1 and one low-side switching element PwrTr2. The semiconductor module has three output terminals (so-called U terminal, V terminal and W terminal). For example, a three-phase motor as an inductor load is connected to the three output terminals.

Such a semiconductor module facilitates the management of parasitic resistance or parasitic capacitance inside the semiconductor module.

In the present disclosure, Embodiments can be combined, appropriately modified or omitted.

While the disclosure has been shown and described in detail, the foregoing description is in all aspects illustrative and not restrictive. It is therefore understood that numerous modifications and variations can be devised.

What is claimed is:

1. A voltage generation circuit configured to generate a control power supply voltage for a high-side drive circuit for operating the high-side drive circuit that controls a state of a high-side switching element, the high-side switching element and a low-side switching element connected in series with each other, the voltage generation circuit comprising:
    a bootstrap circuit including a diode having a cathode connected to a high potential side of the high-side drive circuit to which the control power supply voltage for the high-side drive circuit is applied, and a current limiting resistor connected in series to the diode; and
    a step-down circuit connected to a high potential side of the high-side switching element and an input side of the bootstrap circuit, and configured to output a compensated power supply voltage to the bootstrap circuit, the compensated power supply voltage being generated by stepping down a power supply voltage which is applied to the high potential side of the high-side switching element, and being a voltage for generating the control power supply voltage for the high-side drive circuit via the bootstrap circuit, wherein
    the step-down circuit generates the compensated power supply voltage obtained by adding a compensation voltage corresponding to a voltage drop due to the diode and the current limiting resistor to a control power supply voltage for a low-side drive circuit for operating the low-side drive circuit that controls a state of the low-side switching element.

2. The voltage generation circuit according to claim 1, wherein
    the step-down circuit includes a voltage dividing circuit, and
    the voltage dividing circuit includes a plurality of resistors connected in series with each other and controls a step-down level of the power supply voltage.

3. The voltage generation circuit according to claim 2, wherein
    the voltage dividing circuit is a voltage ladder, and
    the voltage ladder has at least one terminal that is led out from between the plurality of resistors.

4. The voltage generation circuit according to claim 1, further comprising
   at least one of a temperature detection circuit configured to detect a temperature of the step-down circuit and a short-circuit detection circuit configured to detect a short circuit of the step-down circuit.

5. The voltage generation circuit according to claim 1, wherein
   the high-side switching element is a MOSFET.

6. A semiconductor module comprising:
   three low-side drive circuits;
   three low-side switching elements controlled by the three low-side drive circuits, respectively;
   the voltage generation circuit according to claim 1;
   three high-side drive circuits; and
   three high-side switching elements connected in series to the three low-side switching elements, respectively, and controlled by the three high-side drive circuits, respectively, wherein
   the control power supply voltage for the low-side drive circuit is applied to each of the three low-side drive circuits, and
   the control power supply voltage for the high-side drive circuit generated by the voltage generation circuit is applied to each of the three high-side drive circuits.

7. A voltage generation circuit configured to generate a control power supply voltage for a high-side drive circuit for operating the high-side drive circuit that controls a state of a high-side switching element, the high-side switching element and a low-side switching element connected in series with each other, the voltage generation circuit comprising:
   a bootstrap circuit including a diode having a cathode connected to a high potential side of the high-side drive circuit to which the control power supply voltage for the high-side drive circuit is applied, and a current limiting resistor connected in series to the diode; and
   a booster circuit connected to an input side of the bootstrap circuit and configured to output a compensated power supply voltage to the bootstrap circuit, the compensated power supply voltage being generated by boosting a control power supply voltage for a low-side drive circuit for operating the low-side drive circuit that controls a state of the low-side switching element, and being a voltage for generating the control power supply voltage for the high-side drive circuit via the bootstrap circuit, wherein
   the booster circuit generates the compensated power supply voltage obtained by adding a compensation voltage corresponding to a voltage drop due to the diode and the current limiting resistor to the control power supply voltage for the low-side drive circuit,
   the booster circuit includes a voltage dividing circuit that controls a boosting level of the control power supply voltage for the low-side drive circuit, and
   the voltage dividing circuit includes a plurality of resistors connected in series with each other.

8. The voltage generation circuit according to claim 7, wherein
   the voltage dividing circuit is a voltage ladder, and
   the voltage ladder has at least one terminal that is led out from between the plurality of resistors.

9. The voltage generation circuit according to claim 7, further comprising
   at least one of a temperature detection circuit configured to detect a temperature of the booster circuit and a short-circuit detection circuit configured to detect a short circuit of the booster circuit.

10. The voltage generation circuit according to claim 7, wherein
    the high-side switching element is a MOSFET.

11. A semiconductor module comprising:
    three low-side drive circuits;
    three low-side switching elements controlled by the three low-side drive circuits, respectively;
    the voltage generation circuit according to claim 7;
    three high-side drive circuits; and
    three high-side switching elements connected in series to the three low-side switching elements, respectively, and controlled by the three high-side drive circuits, respectively, wherein
    the control power supply voltage for the low-side drive circuit is applied to each of the three low-side drive circuits, and
    the control power supply voltage for the high-side drive circuit generated by the voltage generation circuit is applied to each of the three high-side drive circuits.

* * * * *